US012764222B2

(12) United States Patent
Kim et al.

(10) Patent No.: US 12,764,222 B2
(45) Date of Patent: Oct. 13, 2026

(54) ELECTRONIC DEVICE AND OPERATION METHOD FOR ELECTRONIC DEVICE

(71) Applicant: SAMSUNG ELECTRONICS CO., LTD., Suwon-si (KR)

(72) Inventors: Jinik Kim, Suwon-si (KR); Namjoon Park, Suwon-si (KR); Jeongmin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 485 days.

(21) Appl. No.: 17/855,274

(22) Filed: Jun. 30, 2022

(65) Prior Publication Data

US 2022/0353361 A1 Nov. 3, 2022

Related U.S. Application Data

(63) Continuation of application No. PCT/KR2020/018332, filed on Dec. 15, 2020.

(30) Foreign Application Priority Data

Dec. 31, 2019 (KR) ........................ 10-2019-0180084

(51) Int. Cl.
*H04M 1/72454* (2021.01)
*H04M 1/02* (2006.01)

(52) U.S. Cl.
CPC ..... *H04M 1/72454* (2021.01); *H04M 1/0216* (2013.01); *H04M 1/0268* (2013.01)

(58) Field of Classification Search
CPC ........... H04M 1/72454; H04M 1/0216; H04M 1/0268; H04M 1/6016; H04M 1/605; H04M 1/0243; H04M 1/0214; H04M 1/72403; H04M 2201/34; H04M 2201/36; H04M 2201/38; H04M 2250/12
See application file for complete search history.

(56) References Cited

U.S. PATENT DOCUMENTS 7,002,616 B2 2/2006 Taneya et al.
8,265,705 B2 9/2012 Lee
(Continued)

FOREIGN PATENT DOCUMENTS

CN 109542548 A * 3/2019 ............. G06F 9/451
CN 110401768 A 11/2019
(Continued)

OTHER PUBLICATIONS

English translation of EP-1601165-A1 (Year: 2005).*
(Continued)

*Primary Examiner* — Matthew D. Anderson
(74) *Attorney, Agent, or Firm* — Sughrue Mion, PLLC

(57) ABSTRACT

An electronic device includes a flexible display, a communication circuit, at least one sensor, a processor and a memory storing instructions which, when executed by the processor, cause the electronic device to receive a call from an external electronic device through the communication circuit, connect the call to the external electronic device based on a state of the electronic device, recognize a folded state of the flexible display by using the at least one sensor while the call is connected, and change a setting associated with the call based on the recognized folded state of the flexible display.

16 Claims, 10 Drawing Sheets

(56) References Cited

U.S. PATENT DOCUMENTS

| | | | | |
|---|---|---|---|---|
| 9,344,672 | B2 | 5/2016 | Lee | |
| 10,219,077 | B2 | 2/2019 | Choi et al. | |
| 2004/0204194 | A1* | 10/2004 | Akai | H04M 1/03 455/350 |
| 2004/0259592 | A1* | 12/2004 | Taneya | H04M 1/0245 455/575.4 |
| 2011/0261143 | A1* | 10/2011 | Ponsford | H04N 7/142 348/14.02 |
| 2014/0179380 | A1 | 6/2014 | Roh | |
| 2015/0381929 | A1* | 12/2015 | Lee | H04N 23/57 348/14.03 |
| 2016/0357221 | A1* | 12/2016 | Huh | G06F 3/04845 |
| 2018/0035208 | A1* | 2/2018 | Choi | H04R 1/028 |
| 2022/0060572 | A1* | 2/2022 | Kwon | H04M 1/0243 |
| 2022/0224828 | A1* | 7/2022 | Lim | H04N 23/63 |
| 2022/0276680 | A1* | 9/2022 | Liang | G06F 3/1446 |

FOREIGN PATENT DOCUMENTS

| | | | | | |
|---|---|---|---|---|---|
| CN | 110730260 | | * | 11/2020 | |
| EP | 1601165 | A1 | * | 11/2005 | H04M 1/0243 |
| JP | 2009017197 | A | * | 1/2009 | |
| KR | 100918126 | B1 | | 9/2009 | |
| KR | 1020130052514 | A | | 5/2013 | |
| KR | 1020140099006 | A | | 8/2014 | |
| KR | 1020160143115 | A | | 12/2016 | |
| KR | 1020180012390 | A | | 2/2018 | |

OTHER PUBLICATIONS

English translation of JP 2009017197 A (Year: 2009).*

Communication issued on Mar. 13, 2024 by the Korean Intellectual Property Office in Korean Patent Application No. 10-2019-0180084.

International Search Report (ISA210) and Written Opinion (ISA237) in PCT/KR2020/018332, of Mar. 30, 2021 in application No. PCT/KR2020/018332.

* cited by examiner

ELECTRONIC DEVICE AND OPERATION METHOD FOR ELECTRONIC DEVICE

CROSS-REFERENCE TO RELATED APPLICATION(S)

This application is a bypass continuation of PCT International Application No. PCT/KR2020/018332 filed on Dec. 15, 2020, which is based on and claims priority under 35 U.S.C. § 119 to Korean Patent Application No. 10-2019-0180084 filed on Dec. 31, 2019, in the Korean Intellectual Property Office, the disclosures of which are incorporated by reference herein in their entirety.

BACKGROUND

1. Field

Embodiments disclosed in the disclosure relate to an electronic device including a flexible display and a method for operating the electronic device.

2. Description of Related Art

In recent years, various kinds of electronic devices have been developed and distributed. In particular, mobile devices, such as smartphones, tablet PCs. and wearable devices, which have various functions, as well as existing desktop PCs, are increasingly distributed. Furthermore, due to development of the technologies, electronic devices each including a flexible display that may be physically curved or bent, as well as electronic devices having displays in fixed forms, are being developed and distributed.

Embodiments disclosed in the disclosure provide an electronic device that adaptively performs a call function based on at least one of a state of the electronic device and a folded state of a display, and a method for operating the electronic device.

SUMMARY

According to an embodiment disclosed in the disclosure, an electronic device includes a flexible display, a communication circuit, at least one sensor, a processor and a memory storing instructions, when executed by the processor, cause the electronic device to receive a call from an external electronic device through the communication circuit, connect the call to the external electronic device based on a state of the electronic device, recognize a folded state of the flexible display by using the at least one sensor, while the call is connected, and change a setting associated with the call based on the recognized folded state of the flexible display.

The instructions cause the electronic device to recognize the state of the electronic device using the at least one sensor and connect the call to the external electronic device in response to a change in the state of the electronic device while the call is received from the external electronic device.

The instructions cause the electronic device to recognize a state of the call of a user of the electronic device based on the state of the electronic device during the call.

The folded state of the flexible display may include a folding angle of the flexible display, and the instructions cause the electronic device to change a call scheme to a video call or a voice call based on the folding angle of the flexible display during the call.

The instructions cause the electronic device to adjust a volume of a sound associated with the call based on a folding angle of the flexible display during the call.

The instructions cause the electronic device to adjust an output location or an output direction of a sound associated with the call based on a folding angle of the flexible display during the call.

The electronic device may further include at least one vibration speaker configured to output a sound associated with the call by vibrating at least a portion of the flexible display, and the instructions cause the electronic device to adjust an output location or an output direction of the sound by using the at least one vibration speaker based on a folding angle of the flexible display during the call.

The electronic device may further include a microphone, and the instructions cause the electronic device to adjust a sensitivity of the microphone of the electronic device based on a folding angle of the flexible display during the call.

The instructions cause the electronic device to determine a display location of an image of the call based on the state of the electronic device and the folded state of the flexible display during a video call, and determine an output location or an output direction of a sound associated with the call based on the display location of the image of the call, or a display location of a person included in the image of the call.

The at least one sensor may include at least one of an acceleration sensor, a gyro sensor, a geomagnetic sensor, a bending sensor, an atmospheric pressure sensor, an angle sensor, a touch sensor, or a proximity sensor.

Further, according to an embodiment disclosed in the disclosure, a method for operating an electronic device including a flexible display includes an operation of receiving a call from an external electronic device, an operation of connecting the call to the external electronic device based on a state of the electronic device, and an operation of recognizing a folded state of the flexible display by using the at least one sensor, while the call is connected, and an operation of changing a setting associated with the call based on the recognized folded state of the flexible display.

The connecting of the call may include recognizing the state of the electronic device by using the at least one sensor and connecting the call to the external electronic device in response to a change in the state of the electronic device while the call is received from the external electronic device.

The method may further include recognizing a state of the call of a user of the electronic device based on the state of the electronic device during the call.

The folded state of the flexible display may include a folding angle of the flexible display, and the changing of the setting associated with the call may include changing a call scheme to a video call or a voice call based on the folding angle of the flexible display during the call.

The changing of the setting associated with the call may include adjusting a volume of a sound associated with the call based on a folding angle of the flexible display during the call.

The changing of the setting associated with the call may include adjusting an output location or an output direction of a sound associated with the call based on a folding angle of the flexible display during the call.

The adjusting of the output location or the output direction of the sound may include adjusting the output location or the output direction of the sound by using at least one vibration speaker configured to output the sound by vibrating at least a portion of the flexible display.

The changing of the setting associated with the call may include adjusting a sensitivity of a microphone of the electronic device based on a folding angle of the flexible display during the call.

The method may further include determining a display location of an image of the call based on the state of the electronic device and the folded state of the flexible display during a video call, and determining an output location or an output direction of a sound associated with the call based on the display location of the image of the call, or a display location of a person included in the image of the call.

According to an embodiment disclosed in the disclosure, there is provided a non-transitory computer-readable recording medium having recorded thereon a program for executing the method for operating the electronic device including the flexible display.

BRIEF DESCRIPTION OF THE DRAWINGS

The above and other aspects, features, and advantages of certain embodiments of the present disclosure will be more apparent from the following description taken in conjunction with the accompanying drawings. With regard to description of drawings, the same or similar components may be marked by the same or similar reference numerals.

DETAILED DESCRIPTION

Figure 1:
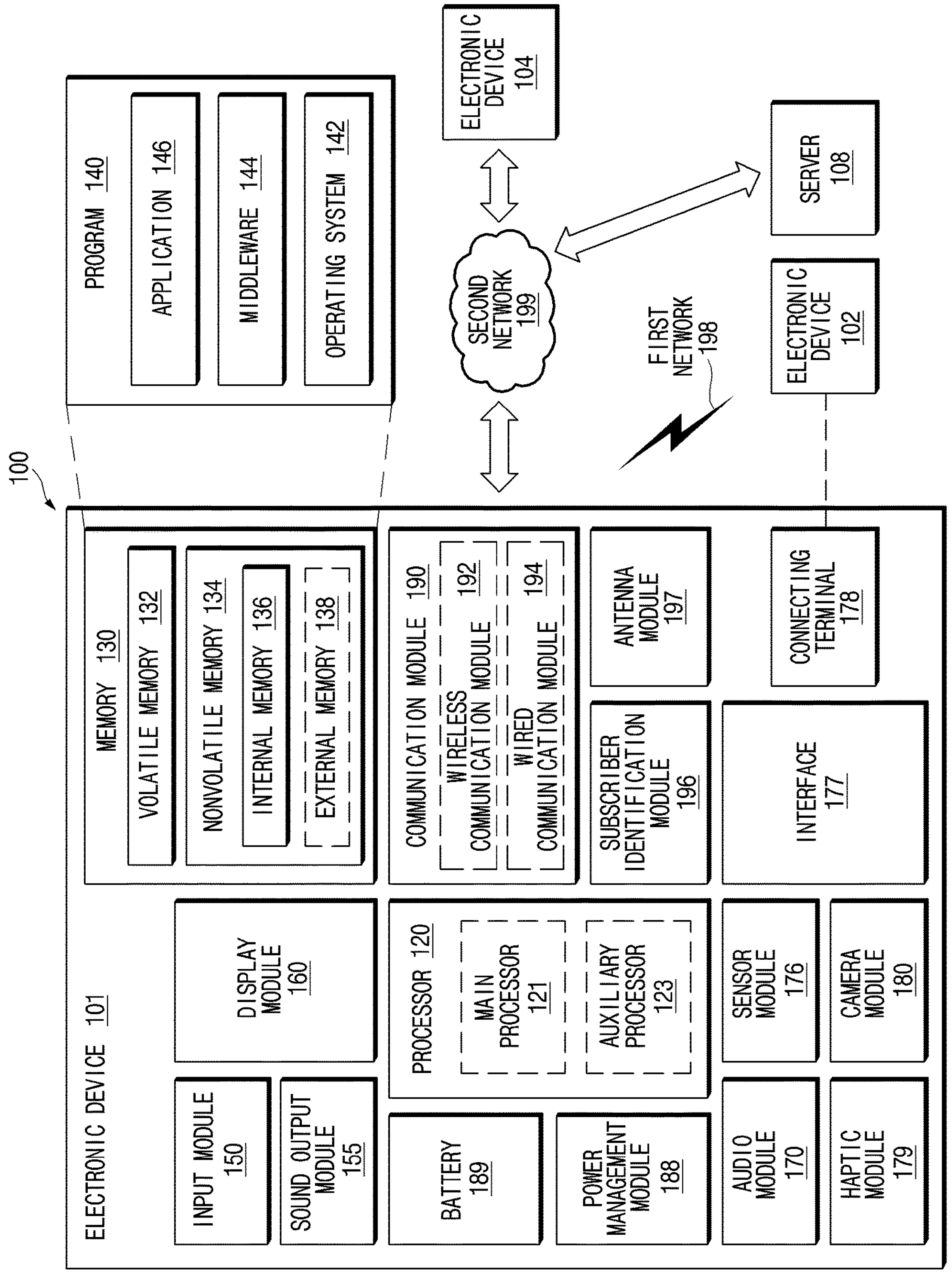
FIG. 1 is a block diagram illustrating an electronic device in a network environment according to various embodiments.

FIG. 1 is a block diagram illustrating an electronic device 101 in a network environment 100 according to various embodiment& Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The sound output module 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RHC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIN)).

Figure 2:
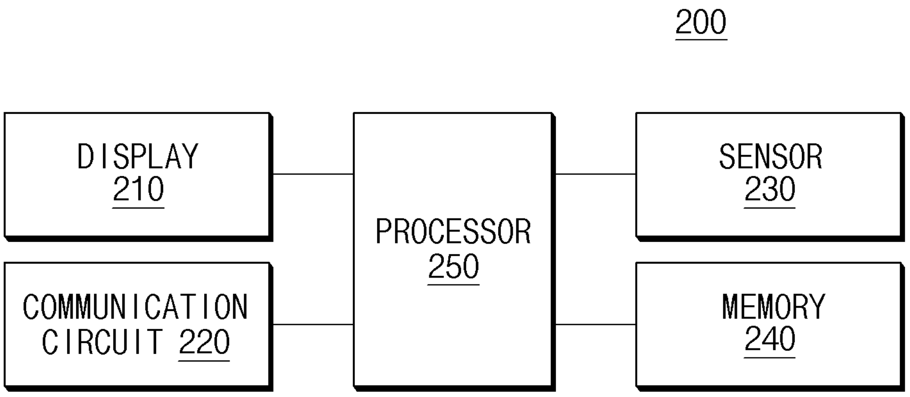
FIG. 2 is a block diagram of an electronic device according to an embodiment.

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example FIG. 2 is a block diagram of an electronic device 200 according to an embodiment.

According to an embodiment, the electronic device 200 (e.g., the electronic device 101 of FIG. 1) may include a display 210 (e.g., the display module 160 of FIG. 1), a communication circuit 220 (e.g., the communication module 190 of FIG. 1), at least one sensor 230 (e.g., the sensor module 176 of FIG. 1), a memory 240 (e.g., the memory 130 of FIG. 1), and a processor 250 (e.g., the processor 120 of FIG. 1).

According to an embodiment, the display 210 may be a flexible display, at least a portion of which is foldable. According to an embodiment the display 210 may display a screen (e.g., an execution screen of a voice call application, a user interface related to a call, or an image of a call) related to a call. According to an embodiment, the display 210 may include a touch panel. For example, the display 210 may be a touchscreen display. According to an embodiment, the display 210 may include the display module 160 illustrated in FIG. 1.

According to an embodiment, the communication circuit 220 may perform communication between the electronic device 200 and an external electronic device (e.g., the electronic device 102 and 104 of FIG. 1). For example, the communication circuit 220 may request a call from the electronic device 200 to the external electronic device or may receive a call from the external electronic device. For example, the communication circuit 220 may connect a call between the electronic device 200 and the external electronic device. According to an embodiment, the communication circuit 220 may include at least a portion of the communication module 190 illustrated in FIG. 1.

According to an embodiment, the at least one sensor 230 may detect a state of the electronic device 200 or a folded state of the display 210. For example, the at least one sensor 230 may detect a motion of the electronic device 200. For example, the at least one sensor 230 may detect whether the electronic device 200 is lifted up. For example, the at least one sensor 230 may detect a folding angle of the display 210. According to an embodiment, the at least one sensor 230 may include at least one of an acceleration sensor, a gyro sensor, a geomagnetic sensor, a bending sensor, an atmospheric pressure sensor, an angle sensor, a touch sensor, or a proximity sensor. According to an embodiment, the at least one sensor 230 may include at least a portion of the sensor module 176 illustrated in FIG. 1.

According to an embodiment, the memory 240 may store at least one program, an application, data, or instructions executed by the processor 250. According to an embodiment, the memory 240 may include at least a portion of the memory 130 illustrated in FIG. 1.

According to an embodiment, the processor 250 may recognize the state of the electronic device 200 by using the at least one sensor 230. For example, the processor 250 may recognize whether there is no motion of the electronic device 200 by using the at least one sensor 230. According to an embodiment, the processor 250 may recognize whether the electronic device 200 is moved from a state of no motion. For example, the processor 250 may recognize whether there occurs a significant motion of the electronic device 200. For example, the processor 250 may recognize whether the electronic device 200 is lifted, by using the at least one sensor 230. For example, the processor 250 may determine whether the electronic device 200 is lifted up, through analysis of a pattern of a value (e.g., measured values of acceleration or angular components) measured by using the at least one sensor 230. For example the processor 250 may analyze whether the measured value is larger or smaller than a specific value or corresponds to a specific frequency or a specific size or more for a specific section (time period). For example, the electronic device 200 may determine whether the electronic device 200 is lifted up, by analyzing statistical characteristics (e.g., averages or standard deviations). For example, the processor 250 may recognize whether the electronic device 200 is lifted, by recognizing a height of the electronic device 200 based on data of the atmospheric pressure sensor.

According to an embodiment, the processor 250 may connect a call to the external electronic device, based on the state of the electronic device 200. According to an embodiment, the processor 250 may connect a call to the external electronic device in response to a change in the state of the electronic device 200 while the electronic device 200 receives the call from the external electronic device. For example, the processor 250 may connect a call to the external electronic device when the electronic device 200 that is stationary on a flat place is lifted up while the call is received. For example, the processor 250 may connect the call to the external electronic device when the user lifts up the electronic device 200 and brings it to an ear of the user or the user lifts up the electronic device 200 and views the display 210 of the electronic device 200. According to various embodiments, the processor 250 may connect the call to the external electronic device in response to the state (e.g., the folded state of the display 210) of the display 210 being changed.

According to an embodiment, the processor 250 may recognize the folded state of the display 210 during the call by using the at least one sensor 230. According to an embodiment, the electronic device 200 may change a setting associated with the call, based on the folded state of the display 210. For example, the processor 250 may change a call scheme to a video call or a voice call based on a folding angle of the display 210 during the call. For example, the processor 250 may adjust a volume of a sound associated with the call based on the folding angle of the display 210 during the call. For example, the processor 250 may reduce the volume of the sound associated with the call as the display 210 is folded further than in a flat state of the display 210. For example, the processor 250 may decrease the volume of the sound associated with the call when the folding angle of the display 210 corresponds to a form, in which the display 210 is attached to an ear and the mouth of the user, and may increase the volume of the sound associated with the call when the folding angle of the display 210 corresponds to a form in which the display 210 is neither attached to an ear of the user nor to the mouth of the user. For example, as a distance between the ear of the user and the speaker becomes smaller according to the folded state of the display 210, the processor 250 may decrease the volume of the sound correspondingly.

According to an embodiment, the processor 250 may adjust an output location or an output direction of the sound associated with the call based on the folding angle of the display 210 during the call. According to an embodiment, when the electronic device 200 includes at least one speaker, the processor 250 may determine, among the speakers, at least one speaker that will output the sound, based on the folding angle of the display 210. According to an embodiment, when the electronic device 200 includes a vibration speaker (e.g., an exciter) that generates a sound by vibrating at least a portion of the display 210, the processor 250 may adjust or change a location, at which the sound is output by using the vibration speaker according to the folding angle of the display 210.

According to an embodiment, the processor 250 may adjust a sensitivity of a microphone of the electronic device 200 based on the folding angle of the display 210 during the call. For example, the processor 250 may decrease the sensitivity of the microphone when the folding angle of the display 210 corresponds to a form in which the display 210 is attached to an ear and the mouth of the user, and may increase the sensitivity of the microphone when the folding angle of the display 210 corresponds to a form in which the display 210 is neither attached to an ear of the user nor to the mouth of the user. For example, as a distance between the mouth of the user and the microphone becomes smaller according to the folded state of the display 210, the processor 250 may decrease the sensitivity of the microphone correspondingly.

According to an embodiment, the processor 250 may determine a display location of an image of the call based on the state of the electronic device 200 and the folded state of the display 210 during the video call. For example, the processor 250 may perform a control to output the image of the call at a portion of the display 210, which is folded, based on the folding angle of the display 210 and a posture (for example, a state in which the electronic device 200 is positioned) of the electronic device 200. For example, the processor 250 may perform a control to display the image of the call at another portion (e.g., an upper screen) of the display 210, which is folded, when the folded portion (e.g., a lower screen) of the display 210 is positioned on a specific object or a hand of the user and supports the electronic device 200.

According to an embodiment, the processor 250 may determine an output location or an output direction of the sound associated with the call based on the display location of the image of the call or a display location of a person included in the image of the call. For example, the processor 250 may output the sound associated with the call at the another portion of the folded display 210 when the folded portion (e.g., the lower screen) of the display 210 is positioned on a specific object or a hand of the user and the image of the call is displayed at the folded another portion (e.g., the upper screen) of the display 210.

According to an embodiment, the processor 250 may output the sound at a location corresponding to a display location (e.g., a location of the mouth of a person) of the face of the person. For example, when the electronic device 200 includes at least one vibration speaker (or an exciter), the processor 250 may output the sound by vibrating the exciter at a location corresponding to the display location of the face of the person included in the image of the call. For example, the processor 250 may control the sound as if the sound was output at the location corresponding to the display location (e.g., the location of the mouth of the person) of the face of the person included in the image of the call, by adjusting a direction and a magnitude of the sound output from the at least one speaker.

According to an embodiment, the processor 250 may recognize the state (e.g., the call state of the user) of the user at least partially based on data (for example, the state of the electronic device 200) detected by the at least one sensor 230 (e.g., the acceleration sensor, the gyro sensor, or the touch sensor). According to an embodiment, the processor 250 may recognize a posture of the electronic device 200 by using the accelerator sensor during the call and may track a change of the posture of the electronic device 200. For example, the processor 250 may recognize a change in the motion of the electronic device 200 by using the acceleration sensor. For example, the processor 250 may recognize whether the electronic device 200 is in a stationary state or in a non-stationary motion by using the acceleration sensor. According to an embodiment, the processor 250 may recognize a motion of the electronic device 200 by using the gyro sensor. For example, the processor 250 may recognize a rotation angle with respect to a rotational axis (e.g., the x, y, and z axes with respect to the electronic device 200) by using the gyro sensor. According to an embodiment, the processor 250 may set an algorithm for determining the call state of the user based on an initial posture of the electronic device 200 when the call is started. According to an embodiment, the processor 250 may determine whether the rotation angle acquired by the gyro sensor agrees with the set algorithm. According to an embodiment, the processor 250 may recognize a grip form of the user by using the touch sensor. According to an embodiment, the processor 250 may determine the call state of the user by analyzing the data detected by the at least one sensor 230 (e.g., the acceleration sensor, the gyro sensor, or the touch sensor) according to the set algorithm. For example, the processor 250 may determine the state of the user including a posture (e.g., a standing posture, a sitting posture, a lying posture, a laterally lying posture), in which the user holds the electronic device 200, a grip form (e.g., a left hand grip, a right hand grip, a posture, in which the electronic device 200 is inserted between the head and a shoulder), and whether the user stares at the display 210, based on the data acquired by the at least one sensor 230.

For example, the processor 250 may determine a roll or a pitch state of the user based on a gyroscope. For example, the processor 250 may determine a sitting state or a standing state of the user based on the acceleration sensor. For example, the processor 250 may recognize the posture of the user as a lying state when a specific rotation (e.g., a pitch/roll), and/or a specific posture (e.g., a sitting/standing posture) is detected. For example, the processor 250 may recognize a call gesture when an acceleration value, by which the electronic device 200 is lifted up, and a rotation, by which the electronic device 200 is made to stand up, are detected in a specific condition. According to an embodiment, a determination reference for recognizing the call gesture may be differently set according to the state (e.g., a sitting state, a standing state, or a lying state) of the user. For example, rotations such as a pitch or a roll may have similar values, but determination references for recognizing a call gesture when the user is sitting or lying may be differently set for acceleration values that are applied in a gravitational direction.

According to an embodiment, the processor 250 may include at least a portion of the processor 120 illustrated in FIG. 1.

According to an embodiment, the electronic device 200 may include at least one speaker (not illustrated). According to an embodiment, the at least one speaker may include at least one vibration speaker (e.g., an exciter) that generates a sound by vibrating at least a portion of the display 210. According to an embodiment, the vibration speaker (e.g., the exciter) may be attached to at least a portion of the display 210. According to an embodiment, the speaker may include the sound output module 155 illustrated in FIG. 1.

The electronic device 200 according to various embodiments may provide a call service that adaptively reflects the call state of the user by connecting a call to the external electronic device 200 or changing or adjusting a setting related to the call during the call based on the state of the electronic device 200 and/or the folded state of the display 210.

Figure 3:
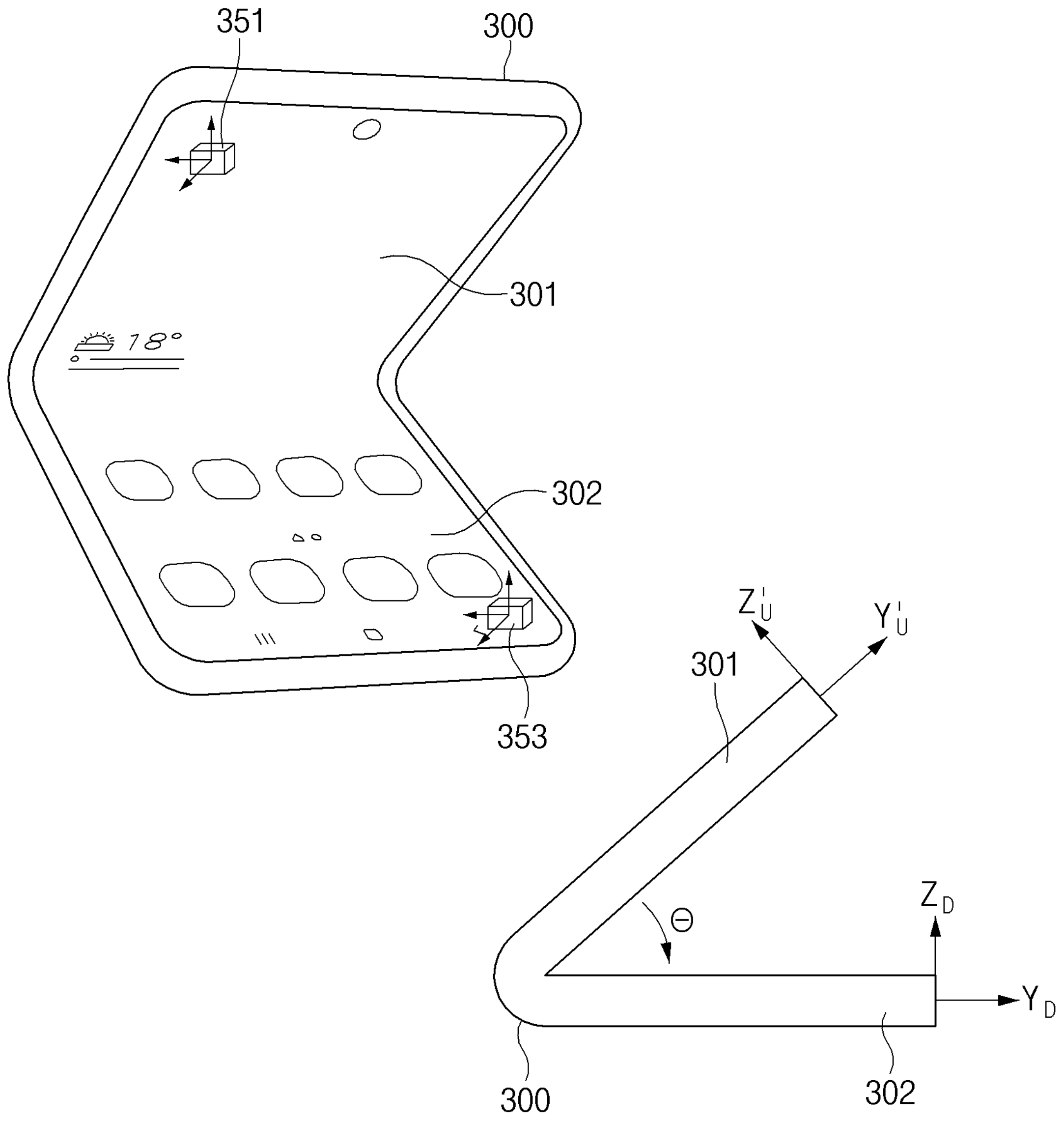
FIG. 3 is a view illustrating an operation of recognizing an angle of a display by an electronic device according to an embodiment.

FIG. 3 is a view illustrating an operation of recognizing an angle of a display by an electronic device 300 according to an embodiment.

According to an embodiment, the electronic device 300 (e.g., the electronic device 101 of FIG. 1 or the electronic device 200 of FIG. 2) may include at least two inertia sensors 351 and 353. For example, the inertial sensors 351 and 353 may include a 6-axis sensor. For example, the two inertial sensors 351 and 353 may be located on different surfaces 301 and 302 when the display is folded. For example, the electronic device 300 may include the two inertial sensors 351 and 353 at locations corresponding to the left side of an upper screen 301 and the right side of a lower screen 302 of the display. According to an embodiment, the electronic device 300 may recognize a folding angle of the display by using the two inertial sensors 351 and 353.

For example, when parameters of the x, y, and z axes in the upper end screen 301 are defined as $X_U$, $Y_U$, and $Z_U$, parameters of the x, y, and z axes in the lower end screen 302 are defined as $X_D$, $Y_D$, and $Z_D$, and a folding angle of the display is defined as θ when the display is folded, the folding angle of the display may be obtained through Equations 1, 2, 3, and 4 as follows.

$$\begin{bmatrix} X'_U \\ Y'_U \\ Z'_U \end{bmatrix} = \begin{bmatrix} 1 & 0 & 0 \\ 0 & -1 & 0 \\ 0 & 0 & -1 \end{bmatrix} \begin{bmatrix} X_U \\ Y_U \\ Z_U \end{bmatrix} \quad \text{[Equation 1]}$$

$$\begin{bmatrix} X_D \\ Y_D \\ Z_D \end{bmatrix} = \begin{bmatrix} 1 & 0 & 0 \\ 0 & \cos\theta & \sin\theta \\ 0 & -\sin\theta & \cos\theta \end{bmatrix} \begin{bmatrix} X'_U \\ Y'_U \\ Z'_U \end{bmatrix} \quad \text{[Equation 2]}$$

$$\theta = \operatorname{argmin} \left\| \begin{bmatrix} 1 & 0 & 0 \\ 0 & \cos\theta & \sin\theta \\ 0 & -\sin\theta & \cos\theta \end{bmatrix} \begin{bmatrix} X'_U \\ Y'_U \\ Z'_U \end{bmatrix} - \begin{bmatrix} X_D \\ Y_D \\ Z_D \end{bmatrix} \right\| \quad \text{[Equation 3]}$$

$$J = (\cos\theta \cdot Y'_U + \sin\theta \cdot Z'_U - Y_D)^2 + (-\sin\theta \cdot Y'_U + \cos\theta \cdot Z'_U - Z_D)^2 \quad \text{[Equation 4]}$$

$$\frac{\partial J}{\partial \theta} = 2 \cdot (\cos\theta \cdot Y'_U + \sin\theta \cdot Z'_U - Y_D) \cdot (-\sin\theta \cdot Y'_U + \cos\theta \cdot Z'_U) + 2 \cdot (-\sin\theta \cdot Y'_U + \cos\theta \cdot Z'_U - Z_D) \cdot (\cos\theta \cdot Y'_U + \sin\theta \cdot Z'_U) = \cos\theta \cdot (Y'_U \cdot Z_D - Y_D \cdot Z'_U) + \sin\theta \cdot (Y'_U \cdot Y_D + Z'_U \cdot Z_D)$$

$$\theta = \tan^{-1}\left( \frac{-Y'_U \cdot Z_D + Y_D \cdot Z'_U}{Y'_U \cdot Y_D + Z'_U \cdot Z_D} \right)$$

According to an embodiment, referring to FIG. 3, the upper screen 301 and the lower screen 302 of the electronic device 300 may use the X axis commonly. According to an embodiment, a rotation of the upper screen 301 of the electronic device 300 may be a 2-dimensional rotation with respect to the X axis.

According to an embodiment, when an acceleration measured in the upper screen 301 has to be equal to an acceleration measured in the lower screen 302 when the upper screen 301 is rotated by the angle θ between the upper screen 301 and the lower screen 302 while the lower screen 302 is taken as the Y axis of the Cartesian coordinate system.

According to an embodiment, the electronic device 300 may obtain a value of that makes a difference between an upper acceleration and a lower acceleration measured after the upper screen 301 is rotated with respect to the lower screen 302 the smallest, by calculating Equation 4. For example, the electronic device 300 may recognize the folding angle of the display through θ that is obtained in Equation 4.

According to an embodiment, the electronic device 300 may include a bending sensor (not illustrated). For example, the bending sensor may be disposed along one surface of a periphery of the display and may have resistance values that are different according to degrees, at which the display is folded. For example, the electronic device 300 may recognize the folding angle (e.g., an angle) of the display based on a value of a signal (e.g., a current) output by the bending sensor for a power source (e.g., a current) applied to the bending sensor.

According to an embodiment, the electronic device 300 may include an angle sensor. For example, the electronic device 300 may recognize the folding angle of the display by using the angle sensor when at least a portion of the display is folded with respect to an arbitrary axis.

Figure 4:
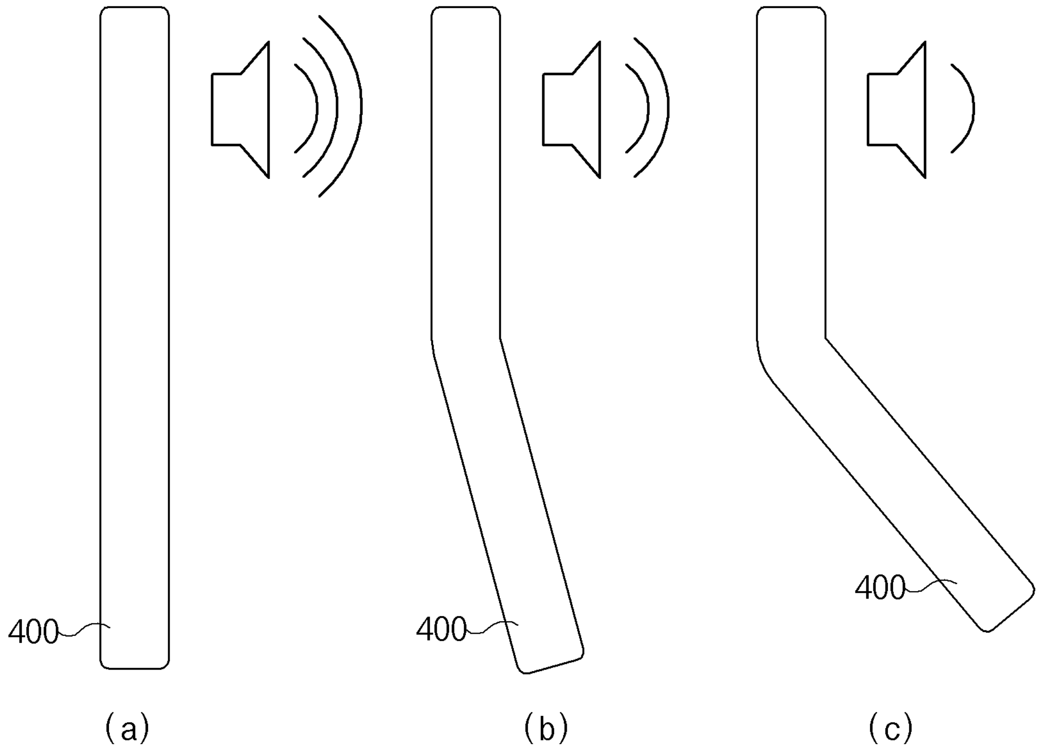
FIG. 4 illustrates a view illustrating an operation of an electronic device according to an embodiment.

FIG. 4 illustrates a view illustrating an operation of an electronic device 400 according to an embodiment.

According to an embodiment, the electronic device 400 (e.g., the electronic device 101 of FIG. 1, the electronic device 200 of FIG. 2, or the electronic device 300 of FIG. 3) may change a setting associated with a call based on a folded state of the display during the call. For example, (a), (b) and (c) of FIG. 4 illustrate a case in which the electronic device 400 adjusts a volume of a sound related to a call based on a folded state of the display.

For example, (a) of FIG. 4 illustrates a state (that is, a flat state of the display), in which the display of the electronic device 400 is not folded, and (b) and (c) of FIG. 4 illustrate a state, in which the display is folded at a specific angle. For example, when the user performs a voice call by using the electronic device 400, the user may bring the electronic device to an ear of the user. According to an embodiment, the electronic device 400 may recognize that the user brought the electronic device 400 to the face (e.g., the ear of the user) of the user by using at least one sensor (e.g., a proximity sensor). In this case, according to the folding angle of the electronic device 400, a degree, by which the electronic device 400 is attached to the face (e.g., the ear and the mouth of the user) of the user, may be different. For example, in case of (a) of FIG. 4, the electronic device 400 may be less attached to the ear and the mouth of the user, and in case of (b) of FIG. 4, the electronic device 400 may be more attached to the ear and the mouth than in (a) of FIG. 4 but may be less attached thereto than in (c) of FIG. 4. For example, when the folding angle of the upper and lower sides of the electronic device 400 is approximately 150 degrees in (c) of FIG. 4, the electronic device 400 may be attached to both the mouth and the ear of the user. For example, as the electronic device 400 is attached to the mouth and the ear of the user more closely, the user may hear the sound output from the electronic device 400 better, and the voice of the user may be received by the electronic device 400 (e.g., the microphone) more loudly. For example the electronic device 400 may recognize the call state (e.g., whether the electronic device 400 is attached to the ear and the mouth of the user more closely) of the user based on the folded state (e.g., the folding angle) of the display, and may adjust a volume of the sound related to the call or adjust a sensitivity of a microphone. For example, the electronic device 400 may output a sound with the highest volume in case of (a) of FIG. 4, the volume of the sound may be adjusted to be lower than (a) of FIG. 4 in case of (b) of FIG. 4, and the volume of the sound may be adjusted to be lower than (b) of FIG. 4 in case of (c) of FIG. 4. For example, the electronic device 400 may set the sensitivity of the microphone to be highest in case of (a) of FIG. 4, may adjust the sensitivity of the microphone to be lower than in (a) of FIG. 4 in case of (b) of FIG. 4, and may adjust the volume of the sound to be lower than in (b) of FIG. 4 in case of (c) of FIG. 4. According to an embodiment, the electronic device 400 may adjust an orientation of the speaker based on the folded state (e.g., the folding angle) of the display. For example, in case of (a) of FIG. 4, the orientation of the speaker may be adjusted such that the sound output through the speaker of the electronic device 400 is spread out to a wider range, and in case of (b) and (c) of FIG. 4, the orientation of the speaker may be adjusted such that the sound output through the speaker gathers in a smaller range as the display is folded more. For example, the electronic device 400 may adjust the orientation of the speaker from a forward direction to a specific direction (or a range) as the folded state of the display is changed to the cases of (a), (b) and (c) of FIG. 4. According to an embodiment, the electronic device 400 may adjust an orientation of the microphone based on the folded state (e.g., the folding angle) of the display. For example, the electronic device 400 may sense sounds of all directions through the microphone in a state, in which the display of (a) of FIG. 4 is not folded, and may selectively sense only a sound of a specific direction (or a range) through the microphone based on beam-forming in a state, in which the display of (b) and (c) of FIG. 4 is folded.

Figure 5:
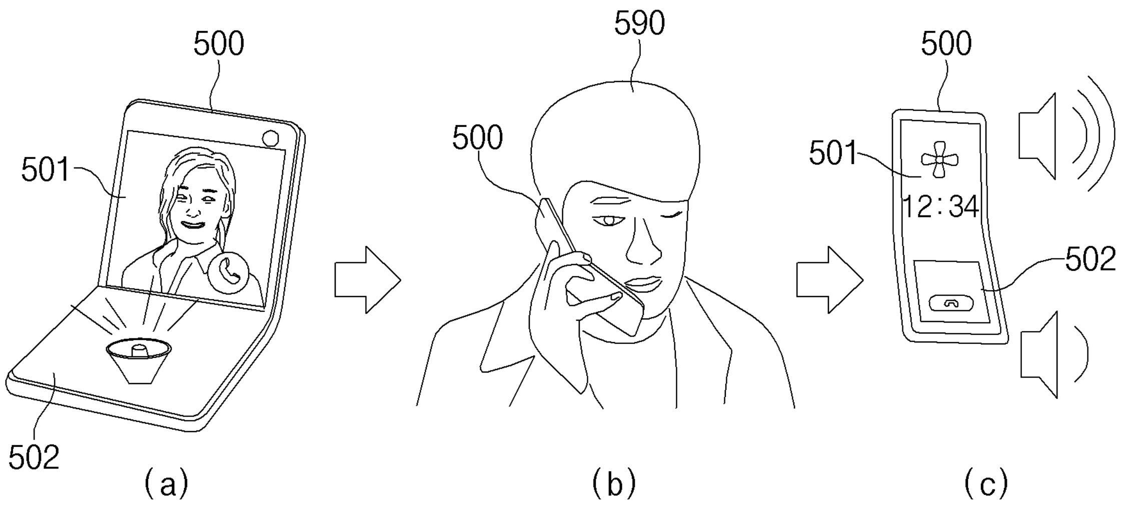
FIG. 5 illustrates a view illustrating an operation of an electronic device according to an embodiment.

FIG. 5 illustrates a view illustrating an operation of an electronic device 500 according to an embodiment.

According to an embodiment, the electronic device 500 (e.g., the electronic device 101 of FIG. 1, the electronic device 20C of FIG. 2, the electronic device 300 of FIG. 3, or the electronic device 400 of FIG. 4) may change a setting associated with a call based on a state of the electronic device 500 and/or a folded state of the display during the call. For example, (a) of FIG. 5 illustrates a case in which the electronic device 500 is stationary on a specific object while the display of the electronic device 500 is folded. For example, the electronic device 500 may provide a video call in a state, in which the display is partially folded. For example, the electronic device 500 may display an image of a call related to the video call on a folded upper surface 501 of the display, and may output a sound at a location corresponding to a folded lower surface (a surface that supports the electronic device 500) 502 of the display.

Referring to (b) of FIG. 5, the electronic device 500 may recognize a change in a state of the electronic device 500 by using at least one sensor. For example, the electronic device 500 may recognize whether the electronic device 500 is lifted up, by using a sensor (e.g., the acceleration sensor, the grip sensor, and/or the gyro sensor). For example, the electronic device 500 may estimate the next operation (e.g., a lift-up) based on a grip form of the user which is sensed by the grip sensor. For example, the electronic device 500 may recognize that a user 590 brings the electronic device 500 to the face, by using a sensor (e.g., the proximity sensor). For example, the electronic device 500 may switch a video call to a voice call when recognizing that the user 590 brings the electronic device 500 to the face.

Referring to (c) of FIG. 5, the electronic device 500 may recognize the folded state of the display by using at least one sensor (e.g., the bending sensor, the angle sensor, the inertia sensor, or the touch sensor). According to an embodiment, the electronic device 500 may change a setting associated with the call, based on the folded state of the display 210 while a voice call is provided. For example, the electronic device 500 may set a volume of a sound associated with the call and/or a sensitivity of a microphone based on the folding angle of the display. For example, according to the folding angle of the display of the electronic device 500, a degree, by which the electronic device 500 is attached to the face (e.g., the ear and the mouth of the user) of the user, may be different. For example, the electronic device 500 may determine a degree, by which the electronic device 500 is attached to the face of the user, based on the folding angle of the display. The electronic device 500 may decrease the volume of the sound or the sensitivity of the microphone as the electronic device 500 is attached to the ear and the mouth of the user more closely, based on the folding angle of the display. For example, the electronic device 500 may set an output location or an output direction of the sound based on the folding angle of the display. For example, the electronic device 500 may output the sound toward the ear of the user through the speaker. For example, when the electronic device 500 includes a plurality of speakers, the sound may be output through a speaker that is adjacent to the ear of the user. According to an embodiment, the electronic device 500 may efficiently deliver the sound associated with the call toward the ear of the user by controlling the outputs of the plurality of speakers.

Figure 6:
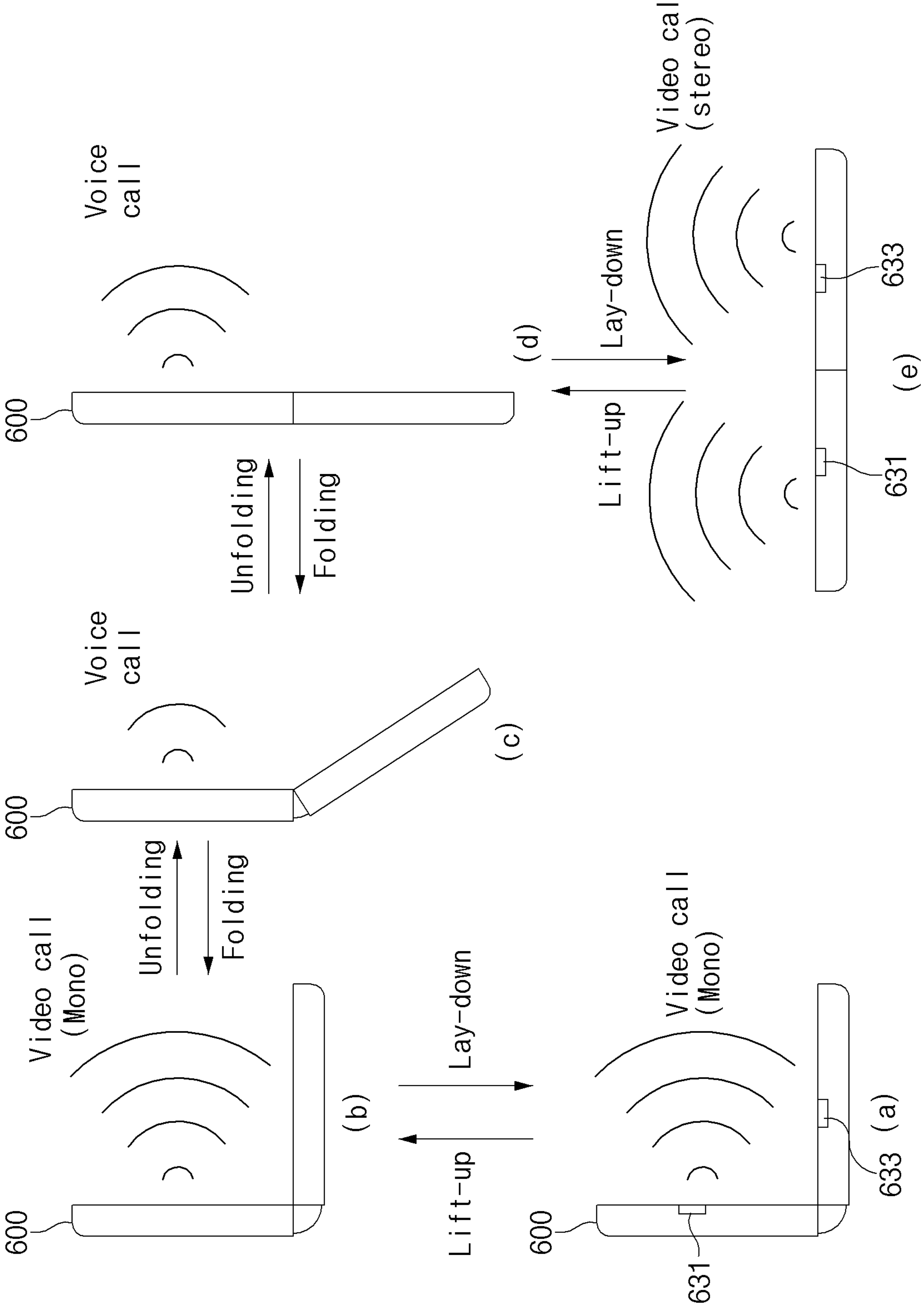
FIG. 6 illustrates a view illustrating an operation of an electronic device according to an embodiment.

FIG. 6 illustrates a view illustrating an operation of an electronic device 600 according to an embodiment.

According to an embodiment, (a) of FIG. 6 illustrates a state, in which the electronic device 600 (e.g., the electronic device 101 of FIG. 1, the electronic device 200 of FIG. 2, the electronic device 300 of FIG. 3, the electronic device 400 of FIG. 4, or the electronic device 500 of FIG. 5) is stationary. According to an embodiment, the electronic device 600 may be positioned while the display is folded. According to an embodiment, the electronic device 600 may provide a video call in a state of (a) of FIG. 6. For example, the electronic device 600 may display an image of the call through an upper portion of the display in a folded state, and may stably support the electronic device 600 through a lower portion of the display. According to an embodiment, the electronic device 600 may output a sound through a speaker during the video call. For example, the electronic device 600 may output the sound at a location corresponding to the image of the call through at least one speaker 631 and 633. For example, when the electronic device 600 includes a plurality of speakers (e.g., vibration speakers), the electronic device 600 may output a sound associated with the call through the speaker corresponding to a portion of the display, at which the image of the call is displayed. As another example, the electronic device 600 may output the sound associated with the call through the speaker corresponding to a portion of the display, at which the image of the call is not displayed.

According to an embodiment, the electronic device 600 may detect a change in a state of the electronic device 600 by using at least one sensor. For example, referring to (b) of FIG. 6, the electronic device 600 may detect that the electronic device 600 is lifted up. According to an embodiment, the electronic device 600 may maintain the state of the call of (a) of FIG. 6 in (b) of FIG. 6.

Referring to (c) of FIG. 6, the electronic device 600 may recognize a folded state of the display by using at least one sensor. For example, the electronic device 600 may recognize the folding angle of the display. According to an embodiment, the electronic device 600 may switch the call mode from a video call to a voice call based on the folding angle of the display. For example, the electronic device 600 may switch the call mode to the voice call when the folding angle (e.g., the angle of the folded display) of the display is greater than the given value.

Referring to (d) of FIG. 6, the electronic device 600 may change a setting associated with the call based on the folding angle of the display during the call. For example, the electronic device 600 may set a volume of a sound associated with the call, a sensitivity of a microphone, and an output location or an output direction of the sound based on the folding angle of the display. For example, the electronic device 600 may increase the volume of the sound associated with the call or increase the sensitivity of the microphone as the display is spread out more flatly as in (d) of FIG. 6 in a state, in which the display is folded at a specific angle as in (c) of FIG. 6. According to an embodiment, the electronic device 600 may increase the volume of the sound associated with the call during the video call (e.g., (a), (b) and (e) of FIG. 6), and may decrease the volume of the sound associated with the call during the voice call (e.g., (c) and (d) of FIG. 6).

Referring to (e) of FIG. 6, the electronic device 600 may recognize that the electronic device 600 is positioned at an arbitrary location by using at least one sensor. For example, when the electronic device 600 has no motion and is stationary, the electronic device 600 may change the call mode. For example, the electronic device 600 may change the call mode from the voice call to the video call. According to an embodiment, the electronic device 600 may change a setting associated with the call, based on the folded state of the display 210, in a positioned state. For example, when the electronic device 600 includes a plurality of speakers (e.g., the vibration speaker (e.g., the exciter)), the electronic device 600 may output the sound associated with the call in stereos by controlling the outputs of the plurality of speakers.

According to an embodiment, an electronic device includes a flexible display, a communication circuit, at least one sensor, a processor, and a memory storing instructions which, when executed by the processor, cause the electronic device to: receive a call from an external electronic device through the communication circuit, connect the call to the external electronic device based on a state of the electronic device, recognize a folded state of the flexible display by using the at least one sensor, while the call is connected, and change a setting associated with the call based on the recognized folded state of the flexible display.

According to an embodiment, the instructions cause the electronic device to: recognize the state of the electronic device using the at least one sensor, and connect the call to the external electronic device in response to a change in the state of the electronic device while the call is received from the external electronic device.

According to an embodiment, the instructions cause the electronic device to recognize a state of the call of a user of the electronic device based on the state of the electronic device during the call.

According to an embodiment, the folded state of the flexible display may include a folding angle of the flexible display, and the instructions cause the electronic device to change a call scheme to a video call or a voice call based on a folding angle of the flexible display during the call.

According to an embodiment, the instructions cause the electronic device to adjust a volume of a sound associated with the call based on a folding angle of the flexible display during the call.

According to an embodiment, the instructions cause the electronic device to adjust an output location or an output direction of a sound associated with the call based on a folding angle of the flexible display during the call.

According to an embodiment, the electronic device may further include at least one vibration speaker that outputs the sound by vibrating at least a portion of the flexible display.

According to an embodiment the instructions cause the electronic device to adjust the output location or the output direction of the sound by using the at least one vibration speaker.

According to an embodiment, the electronic device may further include a microphone, and the instructions cause the electronic device to adjust a sensitivity of the microphone of the electronic device based on a folding angle of the flexible display during the call.

According to an embodiment, the instructions cause the electronic device to determine a display location of an image of the call based on the state of the electronic device and the folded state of the flexible display during a video call, and determine an output location or an output direction of a sound associated with the call based on the display location of the image of the call, and/or a display location of a person included in the image of the call.

According to an embodiment, the at least one sensor may include at least one of an acceleration sensor, a gyro sensor, a geomagnetic sensor, a bending sensor, an atmospheric pressure sensor, an angle sensor, a touch sensor, and a proximity sensor.

Figure 7:
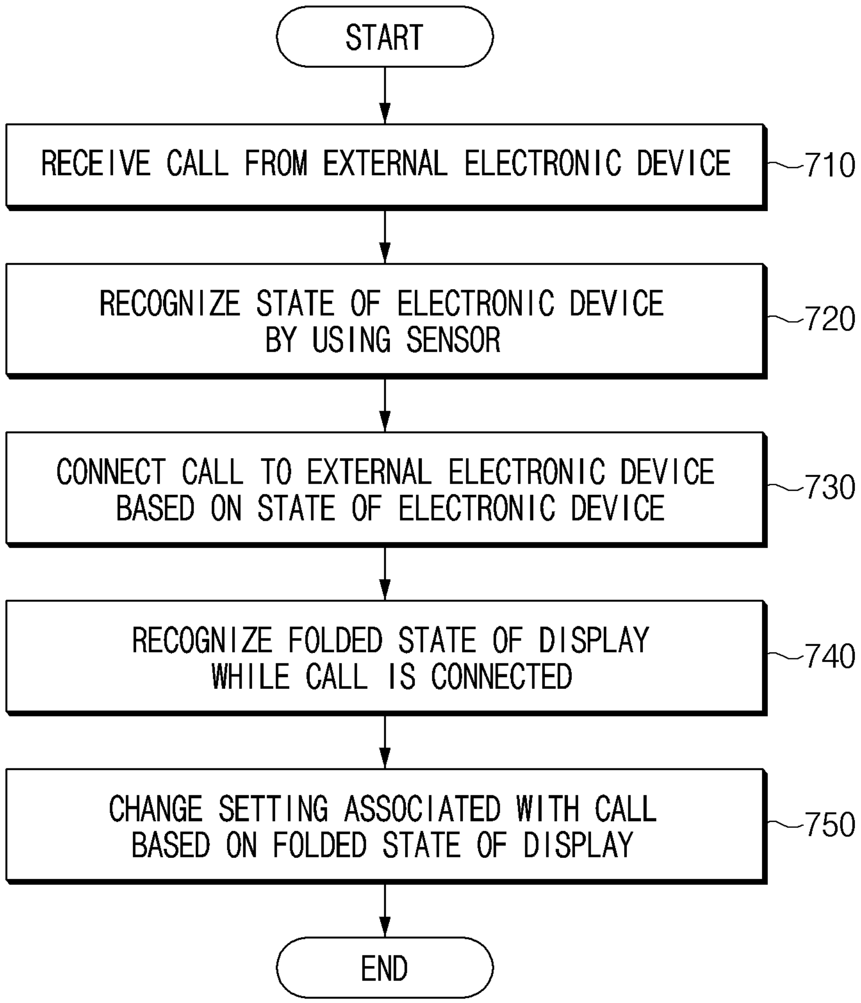
FIG. 7 is a flowchart illustrating a method for operating electronic device according to an embodiment.

FIG. 7 is a flowchart illustrating a method for operating an electronic device (e.g., the electronic device 101 of FIG. 1, the electronic device 200 of FIG. 2, the electronic device 300 of FIG. 4, the electronic device 400 of FIG. 4, the electronic device 500 of FIG. 5, and the electronic device 600 of FIG. 6) according to an embodiment. According to an embodiment, the electronic device may include a flexible display.

According to an embodiment, in operation 710, the electronic device may receive a call from an external electronic device. For example, the electronic device may output a screen (e.g., a screen during reception of a call) or a sound (e.g., a call receiving sound (a bell sound)) corresponding to the call received from the external electronic device.

According to an embodiment, in operation 720, the electronic device may recognize a state of the electronic device by using at least one sensor. According to an embodiment, the at least one sensor may include at least one of an acceleration sensor, a gyro sensor, a geomagnetic sensor, a bending sensor, an atmospheric pressure sensor, an angle sensor, a touch sensor, or a proximity sensor. According to various embodiments, the at least one sensor is not limited to the above-mentioned kinds, and may include various sensors that may be included in the electronic device.

For example, the electronic device may recognize that the electronic device is stationary, by using the sensor. For example, the electronic device may detect a motion of the electronic device. For example, the electronic device may determine whether the electronic device is lifted up, by using the acceleration sensor and/or the gyro sensor. For example, the electronic device may determine whether the electronic device 200 is lifted up, by analyzing statistical characteristics (e.g., averages or standard deviations) of the measured values of acceleration or angular speed components. For example the electronic device may determine whether the electronic device is lifted up, by using the atmospheric pressure sensor. For example, the data of the atmospheric pressure sensor may be substantially inversely proportional to a height of the electronic device. The electronic device may recognize the height of the electronic device based on the data of the atmospheric pressure sensor, and may determine whether the electronic device is lifted up.

According to an embodiment, the electronic device may recognize a state of the user of the electronic device based on the state of the electronic device. For example, the electronic device may recognize a form, in which the user grips the electronic device by using the touch sensor, the proximity sensor, or the inertia sensor (e.g., the acceleration sensor, the gyro sensor, or the 6-axis sensor). For example, the electronic device may recognize whether the user grips the electronic device with the right hand or the left hand of the user, whether the user grips the electronic device in a proper posture, whether the user grips the electronic device between the head and a shoulder of the user, whether the user grips the electronic device while being lying, or whether the user supports the electronic device while being lying laterally. For example, the electronic device may recogrtize and classify a case, in which the user brings the electronic device to the ear for a call, or a case, in which the user stares at the screen of the electronic device while not bringing the electronic device to the ear, by using the proximity sensor.

According to an embodiment, in operation 730, the electronic device may connect a call to the external electronic device, based on the state of the electronic device. For example, the electronic device connects a call to the external electronic device in response to a change in the state of the electronic device while the call is received from the external electronic device. For example, the electronic device may connect a call to the external electronic device when the electronic device that is stationary on a flat place is lifted up while the call is received. For example, the electronic device may connect a call to the external device when the user lifts up the electronic device and brings it to the ear of the user or when the user lifts up the electronic device and views the display of the electronic device. According to various embodiments, the electronic device may connect the call to the external electronic device in response to the state (e.g., the folded state of the display) of the display being changed.

According to an embodiment, in operation 740, the electronic device may recognize the folded state of the display during the call. According to an embodiment, the electronic device may recognize the folded state of the display by using at least one of the acceleration sensor, the gyro sensor, or the 6-axis inertia sensor. According to an embodiment, the electronic device may recognize the folded state of the display by using the angle sensor. For example, the electronic device may recognize a degree, by which at least a portion of the display is bent with respect to at least one axis, by using the angle sensor. According to an embodiment, the electronic device may recognize the folded state of the display by using the bending sensor disposed along one surface of the display. For example, the bending sensor may have different resistance values according to the bending degree, and may output different signal values (e.g., a current value) according to the bending degree when a power source (e.g., an electric current) is applied. For example, the electronic device may recognize the folded state of the display based on the signal value output from the bending sensor when the power source is applied.

According to an embodiment, in operation 750, the electronic device may change a setting associated with the call, based on the folded state of the display.

According to an embodiment, the electronic device may change a call scheme to a video call or a voice call based on the folding angle of the display during the call. For example, the electronic device may change the call scheme to the video call when the display is folded at a first angle (e.g., 90 degrees) during the call. For example, the electronic device may change the call scheme to the voice call when the display is folded at a second angle (e.g., 45 degrees) during the call.

According to an embodiment, the electronic device may adjust the volume of the sound associated with the call based on the folding angle of the display during the call. For example, the electronic device may decrease the volume of the sound associated with the call as the display is folded more from the flat state of the display. For example, the electronic device may decrease the volume of the sound associated with the call when the folding angle of the display has a form, in which the display is attached to the ear and the mouth of the user (for example, the folding angle of the display is approximately 150 degrees), and may increase the volume of the sound associated with the call when the folding angle of the display has a form, in which the display is not attached to the ear and the mouth of the user. For example, as a distance between the ear of the user and the speaker becomes smaller according to the folded state of the display, the electronic device may decrease the volume of the sound correspondingly.

According to an embodiment, the electronic device may adjust an output location or an output direction of the sound associated with the call based on the folding angle of the display during the call. According to an embodiment, the electronic device may include a plurality of speakers. For example, the electronic device may determine, among the plurality of speakers, at least one speaker that will output a sound, based on the folding angle of the display. According to an embodiment, the electronic device may include a vibration speaker (e.g., an exciter) that generates a sound by vibrating at least a portion of the display. For example, the electronic device may adjust a location, at which the sound is output, by using the vibration speaker according to the folding angle of the display.

According to an embodiment, the electronic device may adjust a sensitivity of a microphone of the electronic device based on the folding angle of the display during the call. For example, the electronic device may decrease the sensitivity of the microphone as the display is folded up to a specific angle from the flat state of the display. For example, the electronic device may decrease the sensitivity of the microphone when the folding angle of the display has a form, in which the display is attached to the ear and the mouth of the user (for example, the folding angle of the display is approximately 150 degrees), and may increase the sensitivity of the microphone when the folding angle of the display has a form, in which the display is not attached to the ear and the mouth of the user. For example, as a distance between the mouth of the user and the microphone becomes smaller according to the folded state of the display, the electronic device may decrease the sensitivity of the microphone correspondingly.

According to an embodiment, the electronic device may determine a display location of the image of the call based on the state of the electronic device and the folded state of the display during the call. For example, the electronic device may output the image of the call on an upper surface of the display based on the folding angle of the display and a posture (for example, a state, in which the electronic device is positioned). For example, the electronic device may display the image of the call on the folded upper surface of the display when the folded lower surface of the display is positioned on a specific object or a hand of the user.

According to an embodiment, the electronic device may determine an output location or an output direction of the sound associated with the call based on the display location of the image of the call or a display location of a person included in the image of the call. For example, the electronic device may output the sound associated with the call on the folded lower surface of the display when the image of the call is displayed on the folded upper surface of the display in a state, in which the folded lower surface of the display is positioned on a specific object or on a hand of the user. As another example, the electronic device may output the sound associated with the call through a speaker (e.g., a speaker at a location corresponding to the upper surface that displays the image of the call) at a location that is closest to a location, at which the image of the call is output.

According to an embodiment, the electronic device may output the sound at a location corresponding to a display location (e.g., a location of the mouth of a person) of the face of the person. For example, when the electronic device includes at least one vibration speaker (or an exciter), it may output the sound by vibrating the exciter at a location corresponding to the display location of the face of the person included in the image of the call. According to an embodiment, the electronic device may control a direction of the sound that is output from the at least one speaker as if the sound was output at a location corresponding to the display location (e.g., the location of the mouth of the person) of the face of the person included in the image of the call. For example, the electronic device may control the sound as if the sound was output at the location corresponding to the display location (e.g., the location of the mouth of the person) of the face of the person included in the image of the call, by adjusting a direction and a magnitude of the sound output from the plurality of speakers.

A method for operating an electronic device according to various embodiments may provide a call service that adaptively reflects the call state of the user by connecting a call to the external electronic device or changing or adjusting a setting related to the call during the call based on the state of the electronic device and/or the folded state of the display.

According to an embodiment, a method for operating an electronic device including a flexible display includes receiving a call from an external electronic device, connecting the call to the external electronic device based on the recognized state of the electronic device, recognizing a folded state of the flexible display by using the at least one sensor, while the call is connected, and changing a setting associated with the call based on the recognized folded state of the flexible display.

According to an embodiment, the connecting of the call may include recognizing the state of the electronic device using the at least one sensor, and connecting the call to the external electronic device in response to a change in the state of the electronic device while the call is received from the external electronic device.

According to an embodiment, the method may further include recognizing a state of the call of a user of the electronic device based on the state of the electronic device during the call.

According to an embodiment, the folded state of the flexible display may include a folding angle of the flexible display, and the changing the setting associated with the call may include changing a call scheme to a video call or a voice call based on a folding angle of the flexible display during the call.

According to an embodiment, the changing the setting associated with the call may include adjusting a volume of a sound associated with the call based on a folding angle of the flexible display during the call.

According to an embodiment, the changing the setting associated with the call may include adjusting an output location or an output direction of a sound associated with the call based on a folding angle of the flexible display during the call.

According to an embodiment, the adjusting the volume of the sound may include adjusting the output location or the output direction of the sound by using at least one vibration speaker that outputs the sound by vibrating at least a portion of the flexible display.

According to an embodiment, the changing the setting associated with the call may include adjusting a sensitivity of a microphone of the electronic device based on a folding angle of the flexible display during the call.

According to an embodiment, the method further include determining a display location of an image of the call based on the state of the electronic device and the folded state of the flexible display during a video call, and determining an output location or an output direction of a sound associated with the call based on the display location of the image of the call, and/or a display location of a person included in the image of the call.

According to an embodiment. A non-transitory computer-readable recording medium having recorded thereon a program for executing a method for operating an electronic device including a flexible display, wherein the method includes receiving a call from an external electronic device, connecting the call to the external electronic device based on the recognized state of the electronic device, recognizing a folded state of the flexible display by using the at least one sensor, while the call is connected, and changing a setting associated with the call based on the recognized folded state of the flexible display.

Figure 8:
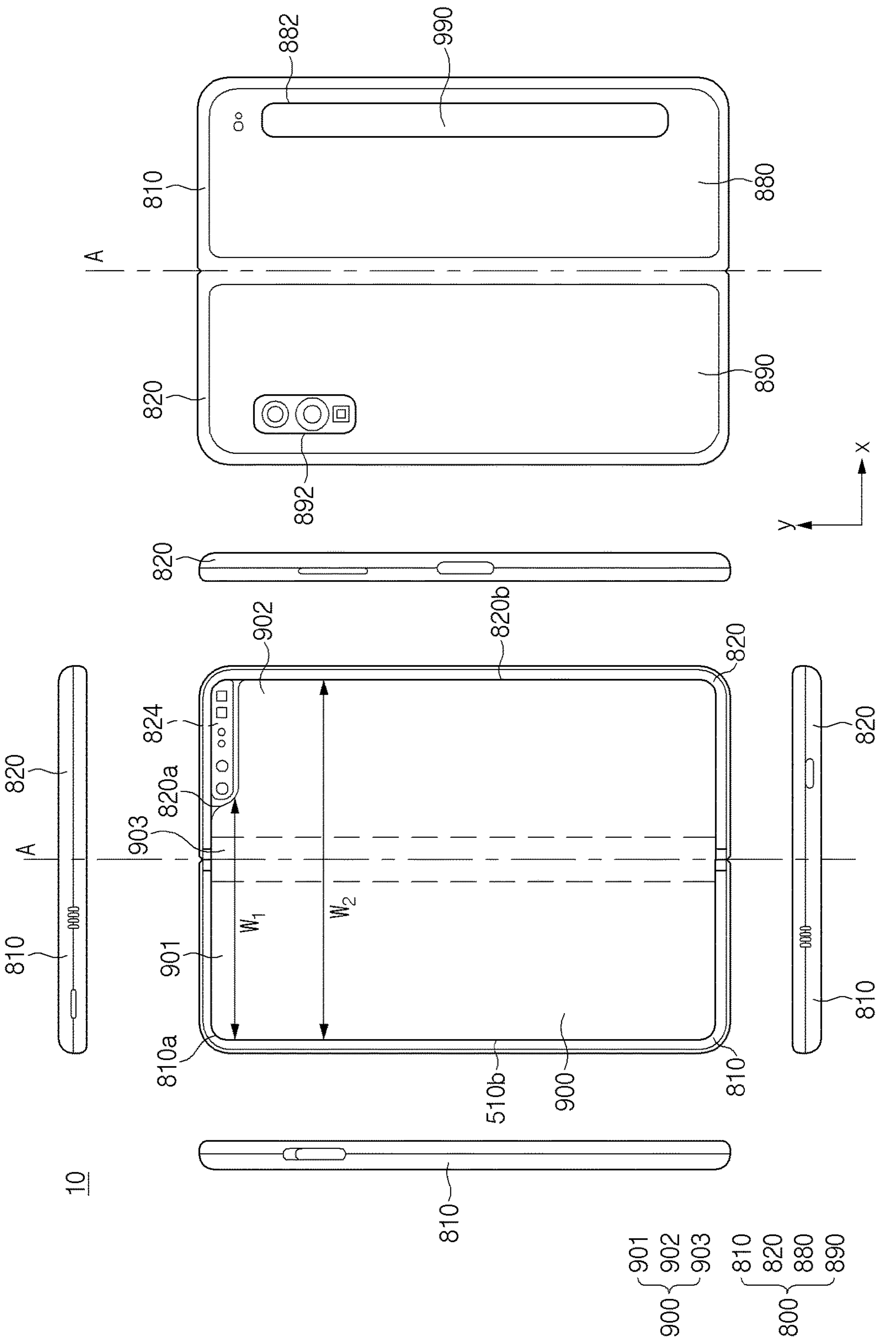
FIG. 8 is a view illustrating an electronic device according to an embodiment.
Figure 9:
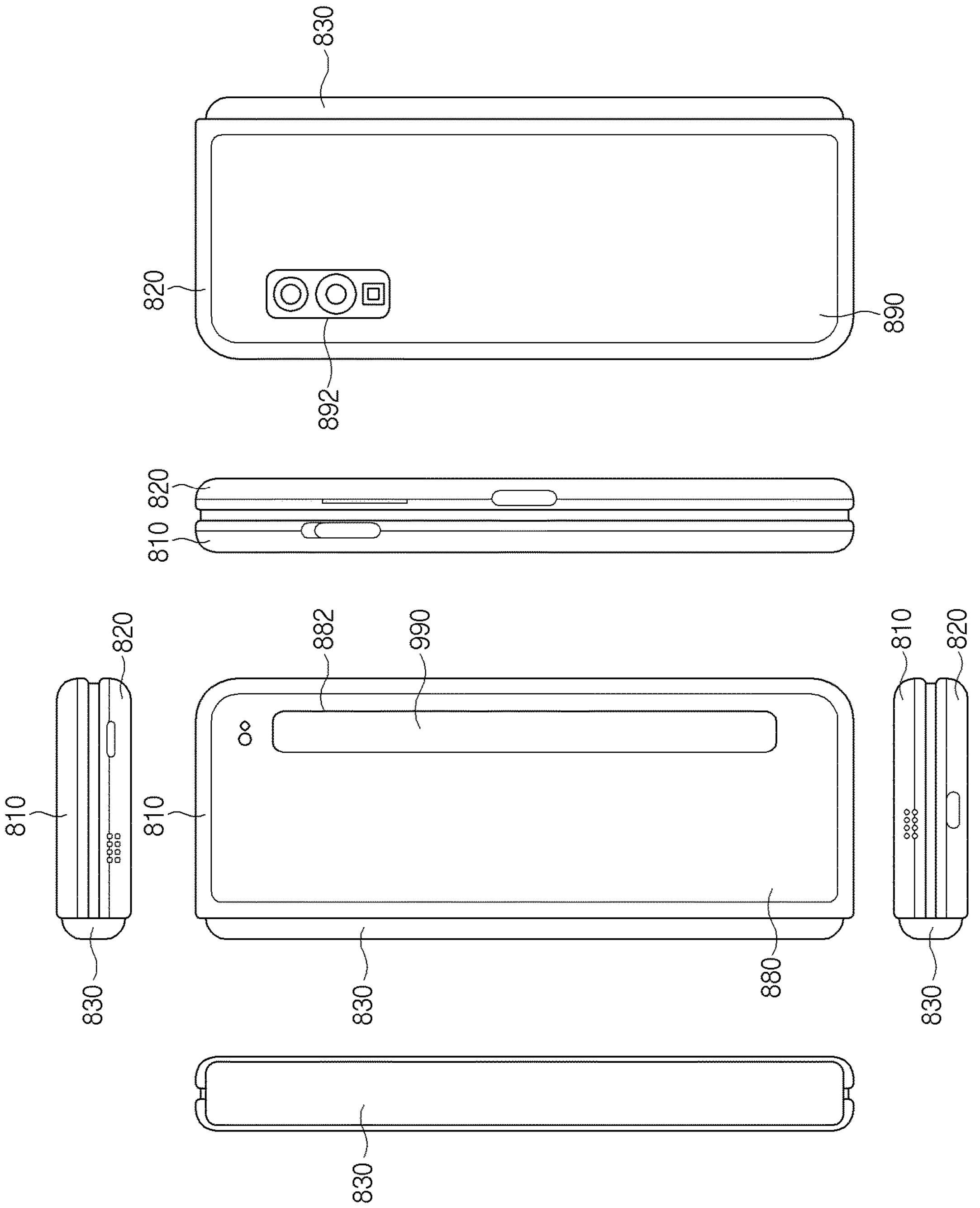
FIG. 9 is a view illustrating an electronic device according to an embodiment.

Referring to FIGS. 8 and 9, in an embodiment, an electronic device 10 may include a foldable housing 800, a hinge cover 830 that covers a foldable portion of the foldable housing 800, and a flexible or foldable display 900 (hereinafter, briefly referred to 'a display 900') disposed in a space formed in the foldable housing 800. In the disclosure, a surface, on which the display 900 is disposed, is defined as a first surface or a front surface of the electronic device 10. An opposite surface of the front surface is defined as a second surface or a rear surface of the electronic device 10. A surface that surrounds a space between the front surface and the rear surface is defined as a third surface or a side surface of the electronic device 10.

According to an embodiment, the foldable housing 800 may include a first housing structure 810, a second housing structure 820 including a sensor area 824, a first rear cover 880, and a second rear cover 890. The foldable housing 800 of the electronic device 10 is not limited to the shape and coupling state illustrated in FIGS. 8 and 2, and may be realized through another shape or another combination and/or coupling of components. For example, in another embodiment, the first housing structure 810 and the first rear cover 880 may be integrally formed, and the second housing structure 820 and the second rear cover 890 may be integrally formed.

In the illustrated embodiment, the first housing structure 810 and the second housing structure 820 may be disposed on opposite sides of a folding axis (axis "A"), and may have a shape that is symmetrical to each other with respect to the folding axis "A" as a whole. As will be described below, an angle or a distance between the first housing structure 810 and the second housing structure 820 may be changed according to whether a state of the electronic device 10 is a flat state, a folded state, or an intermediate state. In the illustrated embodiment, unlike the first housing structure 810, the second housing structure 820 may additionally include the sensor area 824, in which various sensors are disposed, but may have a mutually symmetrical shape in the other areas.

In an embodiment, as illustrated in FIG. 8, the first housing structure 810 and the second housing structure 820 may have recesses that accommodate the display 900 together. In the illustrated embodiment, due to the sensor area 824, the recesses may have two different widths in a direction that is perpendicular to the folding axis "A".

For example, the recesses may have 1) a first width W1 between a first part 810*a* of the first housing structure 810, which is parallel to the folding axis "A" and a first part 820*a* of the second housing structure 820, which is formed at a periphery of the sensor area 824, and 2) a second width W2 defined by a second part 810*b* of the first housing structure 810 and a second part 820*b* of the second housing structure 820, which does not correspond to the sensor area 824 and is parallel to the folding axis "A". In this case, the second width w2 may be longer than the first width w1 In other words, the first part 810*a* of the first housing structure 810 and the first part 820*a* of the second housing structure 820, which have asymmetrical shapes, may define the first width w1 of the recesses, and the second part 810*b* of the first housing structure 810 and the second part 820*b* of the second housing structure 820, which have symmetrical shapes, may define the second width w2 of the recesses. According to an embodiment, the distances of the first portion 820*a* and the second part 820*b* of the second housing structure 820 from the folding axis "A" may be different. The widths of the recesses are not limited to the illustrated examples. In various embodiments, the recesses may have a plurality of widths due to the form of the sensor area 824 or the portions of the first housing structure 810 and the second housing structure 820, which have asymmetrical shapes.

In an embodiment, at least a portion of the first housing structure 810 and the second housing structure 820 may be formed of a metallic material or a nonmetallic material having a selected strength to support the display 900.

In an embodiment, the sensor area 824 may be formed to have a predetermined area at a location that is adjacent to one corner of the second housing structure 820. However, the arrangement, shape, or size of the sensor area 824 is not limited to the illustrated example. For example, in another embodiment, the sensor area 824 may be provided to another corner of the second housing structure 820 or a predetermined area between an upper end corner and a lower end corner of the second housing structure 820. In an embodiment, the components for performing various functions embedded in the electronic device 10 may be exposed to the front surface of the electronic device 10 through the sensor area 824 or through one or more openings provided in the sensor area 824. In various embodiments, the components may include various kinds of sensors. The sensors, for example, may include at least one of a front camera, a receiver, or a proximity sensor.

The first rear cover 880 may be disposed on a rear surface of the electronic device 10 on one side of the folding axis, and for example, may have a substantially rectangular periphery, and the periphery may be surrounded by the first housing structure 810. Similarly, the second rear cover 890 may be disposed on the rear surface of the electronic device 10 on another side of the folding axis, and the periphery thereof may be surrounded by the second housing structure 820.

In the illustrated embodiment, the first rear cover 880 and the second rear cover 890 may have shapes that are substantially symmetrical to each other with respect to the folding axis (axis "A"). However, the first rear cover 880 and the second rear cover 890 do not necessarily have mutually symmetrical shapes, and in another embodiment, the electronic device 10 may include the first rear cover 880 and the second rear cover 890 of various shapes. In another embodiment, the first rear cover 880 may be integrally formed with the first housing structure 810, and the second rear cover 890 may be integrally formed with the second housing structure 820.

In an embodiment, the first rear cover 880, the second rear cover 890, the first housing structure 810, and the second housing structure 820 may define spaces, in which various components (e.g., a printed circuit board or a battery) of the electronic device 10 may be disposed. In an embodiment, one or more components may be disposed on the rear surface of the electronic device 10 or may be visually exposed. For example, at least a portion of a sub-display 990 may be visually exposed through a first rear area 882 of the first rear cover 880. In another embodiment, one or more components or sensors may be visually exposed through a second rear area 892 of the second rear cover 890. In various embodiments, the sensors may include a proximity sensor and/or a rear camera.

Referring to FIG. 9, the hinge cover 830 is disposed between the first housing structure 810 and the second housing structure 820, and may be configured to cover an internal component (e.g., the hinge structure). In an embodiment, the hinge cover 830 may be covered by a portion of the first housing structure 810 and the second housing structure 820 or be exposed to the outside according to the state (the flat state or folded state) of the electronic device 10.

As an example, as illustrated in FIG. 8, when the electronic device 10 is in the flat state, the hinge cover 830 may not be exposed as it is covered by the first housing structure 810 and the second housing structure 820. As an example, as illustrated in FIG. 9, when the electronic device 10 is in a folded state (e.g., a fully folded state), the hinge cover 830 may be exposed between the first housing structure 810 and the second housing structure 820. As an example, when the electronic device 200 is in an intermediate state in which when the first housing structure 810 and the second housing structure 820 define a predetermined angle, the hinge cover 830 may be partly exposed to an outside between the first housing structure 810 and the second housing structure 820. However, in this case, the exposed area may be smaller when the electronic device 10 is in the intermediate state than when the electronic device 10 is in completely folded state. In an embodiment, the hinge cover 830 may include a curved surface.

The display 900 may be disposed in a space defined by the foldable housing 800. For example, the display 900 may be seated on the recess defined by the foldable housing 800, and may constitute most of the front of the electronic device 10.

Accordingly, the front surface of the electronic device 10 may include the display 900, and a partial area of the first housing structure 810 and a partial area of the second housing structure 820, which are adjacent to the display 900. Further, the rear surface of the electronic device 10 may include the first rear cover 880, and a partial area of the first housing structure 810, which is adjacent to the first rear cover 880, the second rear cover 890 and a partial area of the second housing structure 820, which is adjacent to the second rear cover 890.

The display 900 may refer to a display, at least a partial area of which may be deformed to a flat surface or a curved surface. According to an embodiment, the display 900 may include a folding area 903, a first area 901 disposed on one side (e.g., the left side of the folding area 903 illustrated in FIG. 8) with respect to the folding area 903, and a second area 902 disposed on an opposite side (e.g., the right side of the folding area 903 illustrated in FIG. 8).

However, the classification of the areas of the display 900 illustrated in FIG. 8 is illustrative, and the display 900 may be classified into a plurality of areas (e.g., four or more or two) according to the structure or function of the display 900. As an example, although the areas of the display 900 are classified by the folding area 903 or the folding axis (axis "A") extending in parallel to the y axis in the embodiment illustrated in FIG. 8, the areas of the display 900 may be classified with reference to another folding area (e.g., a folding area that is parallel to the x axis) or another folding axis (e.g., a folding axis that is parallel to the x axis) in another embodiment.

The first area 901 and the second area 902 may have shapes that are symmetrical to each other with respect to the folding area 903 as a whole. However, the second area 902, unlike the first area 901, may include a notch that is cut according to presence of the sensor area 824, but may have a shape that is symmetrical to the first area 901 in other areas. In other words, the first area 901 and the second area 902 may include parts having symmetrical shapes, and parts having asymmetrical shapes.

Hereinafter, the operations of the first housing structure 810 and the second housing structure 820 according to the states (e.g., the flat state and the folded state) of the electronic device 10, and the areas of the display 900 will be described.

In an embodiment, when the electronic device 10 is in a flat state (e.g., FIG. 8), the first housing structure 810 and the second housing structure 820 may be disposed to face the same direction while defining an angle of 180 degrees therebetween. A surface of the first area 901 and a surface of the second area 902 of the display 900 may define 180 degrees therebetween, and may face the same direction (e.g., the forward direction of the electronic device). The folding area 903 may define the same plane as the first area 901 and the second area 902.

In an embodiment, when the electronic device 10 is in the folded state (e.g., the state of FIG. 9), the first housing structure 810 and the second housing structure 820 may be disposed to face each other. The surface of the first area 901 and the surface of the second area 902 of the display 900 may face each other while defining a small angle (e.g., 0 degrees to 10 degrees). At least a portion of the folding area 903 may be a curved surface having a predetermined curvature.

In an embodiment, when the electronic device 10 is in the intermediate state (e.g., the state of FIG. 9), the first housing structure 810 and the second housing structure 820 may face each other at a certain angle. The surface of first area 901 and the surface of the second area 902 of the display 900 may define an angle that is larger than in the folded state and is smaller than in the flat state. At least a portion of the folding area 903 may be a curved surface having a predetermined curvature, and the curvature then may be smaller than in the folding state.

Figure 10:
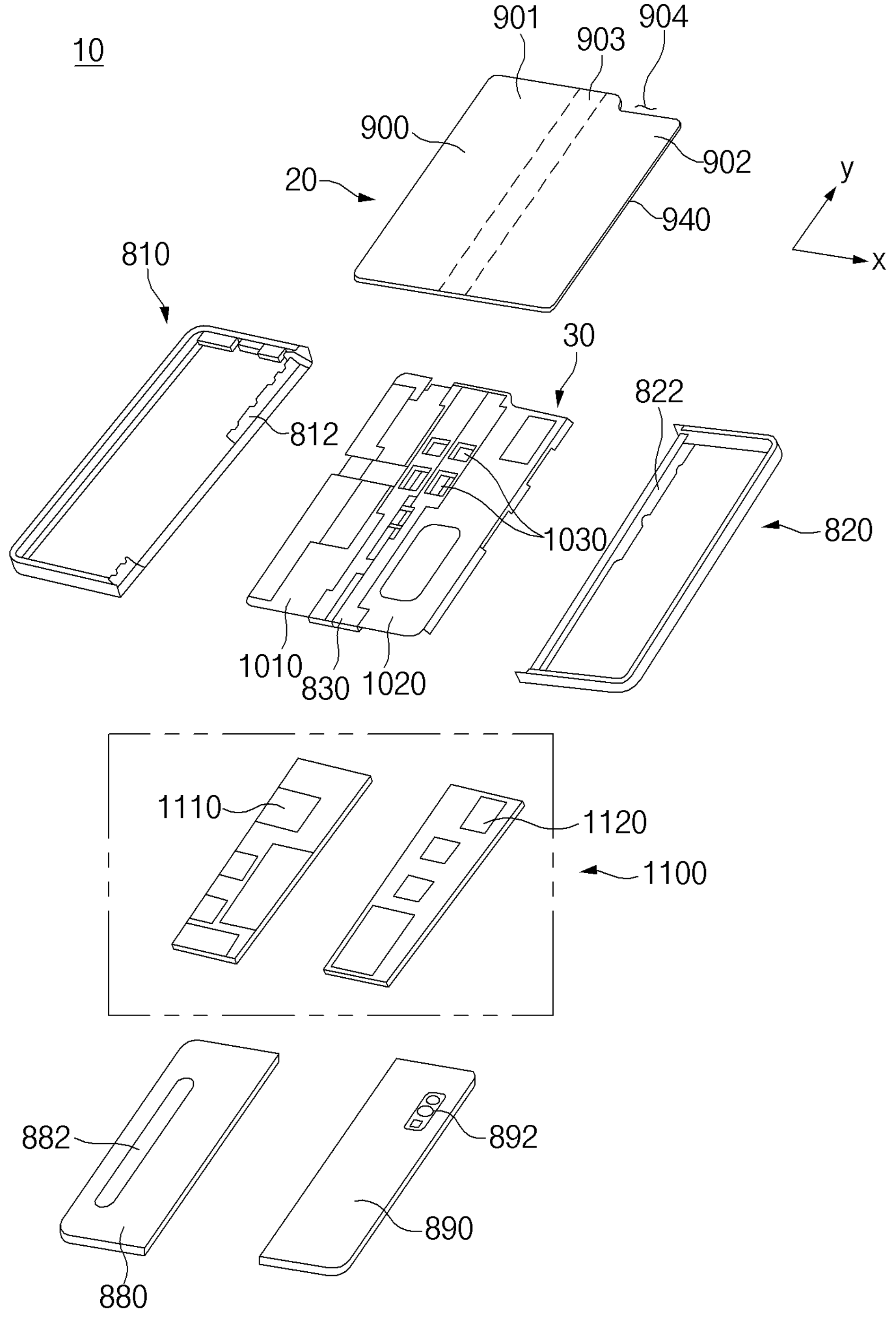
FIG. 10 is an exploded perspective view of an electronic device according to an embodiment.

FIG. 10 is an exploded perspective view of an electronic device 10 according to an embodiment.

Referring to FIG. 10, in an embodiment, the electronic device 10 may include a display unit 20, a bracket assembly 30, a board part 1100, the first housing structure 810, the second housing structure 820, the first rear cover 880, and the second rear cover 890. In the disclosure, the display unit 20 may be referred to as a display module or a display assembly.

The display unit 20, for example, may include the display 900, and one or more plates or layers 940, on which the display 900 is seated. In an embodiment, the plate 940 may be disposed between the display 900 and the bracket assembly 30. The display 900 may be disposed at least a portion of one surface (e.g., an upper surface of FIG. 10) of the plate 940. The plate 940 may have a shape corresponding to the display 900. For example, a partial area of the plate 940 may have a shape corresponding to a notch 904 of the display 900.

The bracket assembly 30 may include a first bracket 1010, a second bracket 1020, a hinge structure disposed between the first bracket 1010 and the second bracket 1020, the hinge cover 830 that covers the hinge structure when the hinge structure is viewed from the outside, and a wiring member 1030 (e.g., a flexible printed circuit board (FPCB)) that crosses the first bracket 1010 and the second bracket 1020.

In an embodiment, the bracket assembly 30 may be disposed between the plate 940 and the board part 1100. As an example, the first bracket 1010 may be disposed between the first area 901 of the display 900 and the first board 1110. The second bracket 1020 may be disposed between the second area 902 of the display 900 and a second board 1120.

In an embodiment, at least a portion of the wiring member 1030 and a hinge structure may be disposed in the interior of the bracket assembly 30. The wiring member 1030 may be disposed in a direction (e.g., the x axis direction) that crosses the first bracket 1010 and the second bracket 1020. The wiring member 1030 may be disposed in a direction (e.g., the x axis direction) that is perpendicular to the folding axis (e.g., the y axis or the folding axis (axis A) of FIG. 8) of the folding area 903 of the electronic device 10.

The board part 1100, as mentioned above, may include the first board 1110 disposed in the first bracket 1010, and the second board 1120 disposed in the second bracket 1020. The first board 1110 and the second board 1120 may be arranged in the interior of a space defined by the bracket assembly 30, the first housing structure 810, the second housing structure 820, the first rear cover 880, and the second rear cover 890. Components for realizing various functions of the electronic device 10 may be mounted on the first board 1110 and the second board 1120.

In an embodiment, the first housing structure 810 and the second housing structure 820 may be assembled to be coupled to opposite sides of the bracket assembly 30 in a state in which the display unit 20 is coupled to the bracket assembly 30. As will be described later, the first housing structure 810 and the second housing structure 820 may be slid on the opposite sides of the bracket assembly 30 and be coupled to the bracket assembly 30.

In an embodiment, the first housing structure 810 may include a first rotation support surface 812, and the second housing structure 820 may include a second rotation support surface 822 corresponding to the first rotation support surface 812. The first rotation support surface 812 and the second rotation support surface 822 may include curved surfaces corresponding to the curved surface included in the hinge cover 830.

In an embodiment, the first rotation support surface 812 and the second rotation support surface 822 may cover the hinge cover 830 such that the hinge cover 830 is not exposed to the rear surface of the electronic device 10 or is exposed minimally when the electronic device 10 is in the flat state (e.g., the state of FIG. 8). Meanwhile, the first rotation support surface 812 and the second rotation support surface 822 may be rotated along a curved surface included in the hinge cover 830 such that the hinge cover 830 is maximally exposed to the rear surface of the electronic device 10 when the electronic device 10 is in the folded state (e.g., the state of FIG. 9).

According to the embodiments disclosed in the disclosure, convenience of a user and user experiences may be increased by controlling an operation of an electronic device based on a state of an electronic device or a state of a flexible display of the electronic device.

According to embodiments disclosed in the disclosure, a call service that is optimized for a user environment of a user based on a state of an electronic device or a state of a flexible display of the electronic device may be provided.

In addition, the disclosure may provide various effects that are directly or indirectly recognized.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e g the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided m a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:

a flexible display;

a communication circuit;

at least one sensor;

a processor; and a memory storing instructions which, when executed by the processor, cause the electronic device to:

receive a call from an external electronic device through the communication circuit, connect a video call to the external electronic device when the electronic device is in a stationary state and a folding angle of the flexible display is a first specified angle, determine a display location of an image of the video call based on a state of the electronic device, a posture of the electronic device, and a folded state of the flexible display during the video call, display the image of the video call in an upper portion of the flexible display or in a lower portion of the flexible display based on the determined display location, determine an output location or an output direction of a sound associated with the video call based on the display location of the image of the video call, change the video call to a voice call when detecting, through the at least one sensor, that the electronic device is lifted up and the folding angle of the flexible display is greater than a second specified angle during the video call, the second specified angle being greater than the first specified angle, and change the voice call to the video call when detecting, through the at least one sensor, that the electronic device is laid down from a position to a lower position, the electronic device is in the stationary state at the lower position and the flexible display is in an unfolded state at the lower position.

2. The electronic device of claim 1, wherein the instructions cause the electronic device to:

identify the state of the electronic device using the at least one sensor; and connect the video call to the external electronic device in response to a change in the state of the electronic device while the call is received from the external electronic device.

3. The electronic device of claim 1, wherein the instructions cause the electronic device to:

identify a state of the call of a user of the electronic device based on the state of the electronic device identified through the at least one sensor during the call.

4. The electronic device of claim 1, wherein the instructions cause the electronic device to:

adjust a volume of a sound associated with the call based on the folding angle of the flexible display during the call.

5. The electronic device of claim 1, wherein the instructions cause the electronic device to:

adjust an output location or an output direction of a sound associated with the call based on the folding angle of the flexible display during the call.

6. The electronic device of claim 1, further comprising:

at least one vibration speaker configured to output a sound associated with the call by vibrating at least a portion of the flexible display, wherein the instructions cause the electronic device to:

adjust an output location or an output direction of the sound by using the at least one vibration speaker based on the folding angle of the flexible display during the call.

7. The electronic device of claim 1, further comprising:

a microphone, wherein the instructions cause the electronic device to:

adjust a sensitivity of the microphone of the electronic device based on the folding angle of the flexible display during the call.

8. The electronic device of claim 1, wherein the at least one sensor includes at least one of an acceleration sensor, a gyro sensor, a geomagnetic sensor, a bending sensor, an atmospheric pressure sensor, an angle sensor, a touch sensor, or a proximity sensor.

9. A method for operating an electronic device including a flexible display and at least one sensor, the method comprising:

receiving a call from an external electronic device;

connecting a video call to the external electronic device when the electronic device is in a stationary state and a folding angle of the flexible display is a first specified angle;

determining a display location of an image of the video call based on a state of the electronic device, a posture of the electronic device, and a folded state of the flexible display during the video call;

displaying the image of the video call in an upper portion of the flexible display or in a lower portion of the flexible display based on the determined display location;

determining an output location or an output direction of a sound associated with the video call based on the display location of the image of the video call;

changing the video call to a voice call when detecting, through the at least one sensor, that the electronic device is lifted up and the folding angle of the flexible display is greater than a second specified angle during the video call, the second specified angle being greater than the first specified angle; and changing the voice call to the video call when detecting, through the at least one sensor, that the electronic device is laid down from a position to a lower position, the electronic device is in the stationary state at the lower position and the flexible display is in an unfolded state at the lower position.

10. The method of claim 9, wherein the connecting of the video call comprises:

identifying the state of the electronic device by using the at least one sensor; and connecting the video call to the external electronic device in response to a change in the state of the electronic device while the call is received from the external electronic device.

11. The method of claim 9, further comprising:

identifying a state of the call of a user of the electronic device based on the state of the electronic device identified through the at least one sensor during the call.

12. The method of claim 9, further comprising changing a setting associated with the call, wherein the changing of the setting associated with the call comprises:

adjusting a volume of a sound associated with the call based on the folding angle of the flexible display during the call.

13. The method of claim 9, further comprising changing a setting associated with the call, wherein the changing of the setting associated with the call comprises:

adjusting an output location or an output direction of a sound associated with the call based on the folding angle of the flexible display during the call.

14. The method of claim 13, wherein the adjusting of the output location or the output direction of the sound comprises:

adjusting the output location or the output direction of the sound by using at least one vibration speaker configured to output the sound by vibrating at least a portion of the flexible display.

15. The method of claim 9, further comprising changing a setting associated with the call, wherein the changing of the setting associated with the call comprises:

adjusting a sensitivity of a microphone of the electronic device based on the folding angle of the flexible display during the call.

16. A non-transitory computer-readable recording medium having recorded thereon a program for executing the method of claim 9.

* * * * *